United States Patent
Hong et al.

(10) Patent No.: US 11,241,682 B2
(45) Date of Patent: Feb. 8, 2022

(54) METHOD FOR PREPARING SUPPORTED METAL CATALYST AND SUPPORTED METAL CATALYST PREPARED THEREFROM

(71) Applicants: Hyundai Motor Company, Seoul (KR); Kia Motors Corporation, Seoul (KR); Institute for Research & Industry Cooperation Pusan National University, Busan (KR)

(72) Inventors: Woong Pyo Hong, Gyeonggi-do (KR); Seung Jeong Oh, Gyeonggi-do (KR); Jin Hyeok Cha, Gyeonggi-do (KR); Se Hun Kwon, Busan (KR); Woo Jae Lee, Busan (KR)

(73) Assignees: Hyundai Motor Company, Seoul (KR); Kia Motors Corporation, Seoul (KR); Institute for Research & Industry Cooperation Pusan National University, Busan (KR)

( * ) Notice: Subject to any disclaimer, the term of this patent is extended or adjusted under 35 U.S.C. 154(b) by 210 days.

(21) Appl. No.: 16/662,767

(22) Filed: Oct. 24, 2019

(65) Prior Publication Data

US 2020/0276569 A1 Sep. 3, 2020

(30) Foreign Application Priority Data

Feb. 28, 2019 (KR) .................. 10-2019-0023830

(51) Int. Cl.
*B01J 37/02* (2006.01)
*H01M 4/92* (2006.01)
*B01J 21/18* (2006.01)

(52) U.S. Cl.
CPC ........... *B01J 37/0217* (2013.01); *B01J 21/18* (2013.01); *B01J 37/0238* (2013.01); *H01M 4/926* (2013.01)

(58) Field of Classification Search
CPC ........ B01J 21/18; B01J 23/42; B01J 37/0217; B01J 37/0221; B01J 37/0238;
(Continued)

(56) References Cited

U.S. PATENT DOCUMENTS 2,798,051 A * 7/1957 Bicek ...................... B01J 23/70
502/334
3,272,434 A * 9/1966 Zettlemoyer .......... A01G 15/00
239/2.1
(Continued)

FOREIGN PATENT DOCUMENTS

GB 951807 A * 3/1964 ............ H01M 4/86
JP 2016-189432 A 11/2016
(Continued)

OTHER PUBLICATIONS

J. L. Gomez de la Fuente et al., "Functionalization of carbon support and its influence on the electrocatalytic behaviour of Pt/C in H2 and CO electrooxidation." Carbon 44, pp. 1919-1929. (Year: 2006).*

*Primary Examiner* — Patricia L. Hailey
(74) *Attorney, Agent, or Firm* — Mintz Levin Cohn Ferris Glovsky and Popeo, P.C.; Peter F. Corless

(57) ABSTRACT

Disclosed is a method for preparing a metal catalyst composite. The method includes pre-treating a carbon support in a reactor, and depositing a metal precursor on the pre-treated carbon support. The pre-treating the carbon support may include exposing the carbon support to a nucleating agent, for example, titanium tetrachloride ($TiCl_4$), silicon tetrachloride ($SiCl_4$) and carbon tetrachloride ($CCl_4$).

19 Claims, 14 Drawing Sheets

(58) Field of Classification Search
CPC ........ C23C 16/45525; C23C 16/45527; C23C 16/0209; H01M 4/92; H01M 4/926; H01M 2250/20; Y02E 60/50
USPC ........ 502/180, 181, 185; 427/115, 124, 125, 427/251, 255.23, 255.5, 299, 314; 423/445 R, 449.2, 449.4, 460; 428/403
See application file for complete search history.

(56) References Cited

U.S. PATENT DOCUMENTS

| | | | | |
|---|---|---|---|---|
| 3,539,372 | A * | 11/1970 | Aron | C08L 67/00 106/472 |
| 3,629,145 | A * | 12/1971 | Morikawa | B01J 23/44 502/74 |
| 5,772,974 | A * | 6/1998 | Ohashi | C01B 32/05 423/447.7 |
| 6,491,848 | B1 * | 12/2002 | Sato | H01G 9/155 252/510 |
| 10,454,115 | B2 * | 10/2019 | Ha | B01J 37/0207 |
| 2009/0246367 | A1 * | 10/2009 | Huotari | C01B 32/162 427/215 |
| 2010/0068125 | A1 * | 3/2010 | Narukawa | C01B 33/035 423/460 |
| 2011/0086235 | A1 * | 4/2011 | Sheel | C23C 16/407 428/448 |
| 2011/0309306 | A1 * | 12/2011 | Zhou | C30B 29/06 252/500 |

FOREIGN PATENT DOCUMENTS

| | | |
|---|---|---|
| KR | 10-2011-0135305 A | 12/2011 |
| KR | 101501305 B1 | 3/2015 |
| KR | 101801789 B1 | 11/2017 |
| KR | 101799190 B1 | 12/2017 |
| WO | 2009-004117 A1 | 1/2009 |

* cited by examiner

METHOD FOR PREPARING SUPPORTED METAL CATALYST AND SUPPORTED METAL CATALYST PREPARED THEREFROM

CROSS-REFERENCE TO RELATED APPLICATION

This application claims under 35 U.S.C. § 119A the benefit of priority to Korean Patent Application No. 10-2019-0023830 filed on Feb. 28, 2019, the entire contents of which are incorporated herein by reference.

TECHNICAL FIELD

The present invention relates to a method for preparing a metal catalyst composite, for example, a metal catalyst supported on a carbon, and a metal catalyst prepared by the same.

BACKGROUND

In general, a polymer electrolyte membrane fuel cell (PEMFC) is a high power fuel cell having a high current density, and needs to secure high output performance of at least tens of kW or more under various driving conditions so as to be applied to vehicles. For example, the PEMFC requires stable operation in a wide current density range, exclusion of water leakage, rapid driving, or the like.

A reaction to generate electricity of a fuel cell occurs in a membrane electrode assembly (MEA) including an ionomer-based electrolyte membrane and electrodes, i.e., an anode and a cathode. In order to increase performance of an electrode for polymer electrolyte fuel cells, the electrode generally includes a catalyst. For example, a metal catalyst or a metal catalyst composite may be used as a catalyst for fuel cells. Particularly, a metal catalyst having a size of a few nanometers (nm) may be used as being supported on a support having a wide surface area and a size of dozens to hundreds of nanometers (nm). Particularly, a carbon (C) support having a large surface area and high electrical conductivity has been used as inexpensive source of the support.

In the related art, an expensive metal catalyst has not been effectively supported on a carbon support due to low surface energy of the carbon support, thus causing cost increase and difficulty in mass production. Accordingly, increase in an electrochemically active surface area and availability of a catalyst by uniformly distributing metal nano-particles of a high density to a carbon support is required.

SUMMARY OF THE INVENTION

In one preferred aspect, provided is a method for preparing a metal catalyst composite (or "supported metal catalyst) which may include a metal catalyst supported on a carbon so as to increase an electrochemically active surface area of the supported metal catalyst by increasing a supported surface area of a metal precursor through pre-treatment of a carbon support before the metal precursor is supported on the carbon support.

In one preferred aspect, provided is a method of preparing a metal catalyst composite (or "supported metal catalyst") by improving a supported density and an electrochemically active surface area of a supported metal catalyst through pre-treatment. For instance, a carbon support may be exposed to a nucleating agent including one or more of titanium tetrachloride ($TiCl_4$), silicon tetrachloride ($SiCl_4$) and carbon tetrachloride ($CCl_4$).

The term "metal catalyst composite" as used herein refers to a composite material including at least metal component to a catalyst and non-metallic material that functions as a physical support. In certain preferred aspect, the metal catalyst composite may include active catalyst and non-reactive material (e.g., support) that is not involved in the catalytic reaction but provides physical support to avoid aggregation of the supported material (catalyst) and increase the exposed surface area of the supported material. Preferred metal catalyst composite may include a metal catalyst (e.g., transition metal catalyst such as platinum (Pt) or palladium (Pd)), and a carbon component such as carbon black, carbon particles, graphene, graphite, or carbon nanomaterials (e.g., nanotube, nanoparticles, or fullerene).

The term "nucleating agent" as used herein refers to a material or compound that induce, promote or facilitate nucleation in a medium or on a surface of solid material. For instance, the nucleating agent may increase number of position or sites where crystals, powders, particles, aggregations or precipitations may start to be formed. In certain embodiments, the nucleating agent may change surface properties of the solid material in order to facilitate nucleation and increase the nucleating sites. Non-limiting examples of the nucleating agent may include titanium tetrachloride ($TiCl_4$), silicon tetrachloride ($SiCl_4$) and carbon tetrachloride ($CCl_4$).

In one preferred aspect, provided is a method of preparing a metal catalyst composite in which a metal (e.g., catalyst) is uniformly supported by coating a metal precursor in atomic layer units through atomic layer deposition (ALD) using a fluidized bed reactor.

In one aspect, the present invention provides a method for preparing a metal catalyst composite. The method may include pre-treating a carbon support in a reactor, and depositing a metal precursor on the pre-treated carbon support.

The carbon support may be supplied in the reactor by any means prior to pre-treating. The metal precursor may be suitably supplied into the reactor for depositing the metal precursor.

The pre-treating the carbon support may include exposing the carbon support to a nucleating agent. Preferably, the nucleating agent may include one or more selected from the group consisting of titanium tetrachloride ($TiCl_4$), silicon tetrachloride ($SiCl_4$) and carbon tetrachloride ($CCl_4$).

Preferably, an inner pressure of the reactor is maintained at about $10^{-10}$ Torr to 1 Torr.

The carbon support may suitably include carbon black, and any other carbon source that can be used as supporting material for metal catalyst composite may be used without limitation.

In the pre-treating, the carbon support may be exposed to the nucleating agent for about 10 minutes to 20 minutes.

Preferably, the pre-treating the carbon support may include heating the reactor. For instance, in the pre-treating the carbon support, an inner temperature of the reactor may be within a range of about 200° C. to 400° C. Moreover, in the pre-treating the carbon support, the inner temperature of the reactor may be maintained for about 30 minutes to 3 hours.

Preferably, the metal precursor may suitably include a platinum (Pt) precursor.

The method may further include substituting the metal precursor with a metal, after the depositing the metal precursor.

Preferably, the depositing the metal precursor may be performed using an atomic layer deposition (ALD) method.

The ALD method may include supplying the metal precursor to the carbon support, first purging an inert gas into the reactor, substituting the metal precursor with a metal by supplying a reaction gas into the reactor, and second purging the inert gas into the reactor.

Preferably, the supplying the metal precursor, the first purging, the substituting the metal precursor and the second the purging may be sequentially carried out to be set as one cycle, and the cycle may be repeated. Preferably, the cycle may be repeated 1 to 20 times. Preferably, the reaction gas may include one or more selected from the group consisting of oxygen ($O_2$), ozone ($O_3$) and a combination thereof.

The reactor may suitably include a rotating member. For instance, the rotating member may be driven during the supplying the metal precursor, the first purging, the substituting the metal precursor and the second purging.

Further provided is a metal catalyst composite prepared by the method as described herein. The metal catalyst composite may be including a carbon support and a metal catalyst deposited thereon.

Also provided is a fuel cell that includes the metal catalyst composite described herein.

Still further provided is a vehicle that includes the fuel cell as described herein, Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
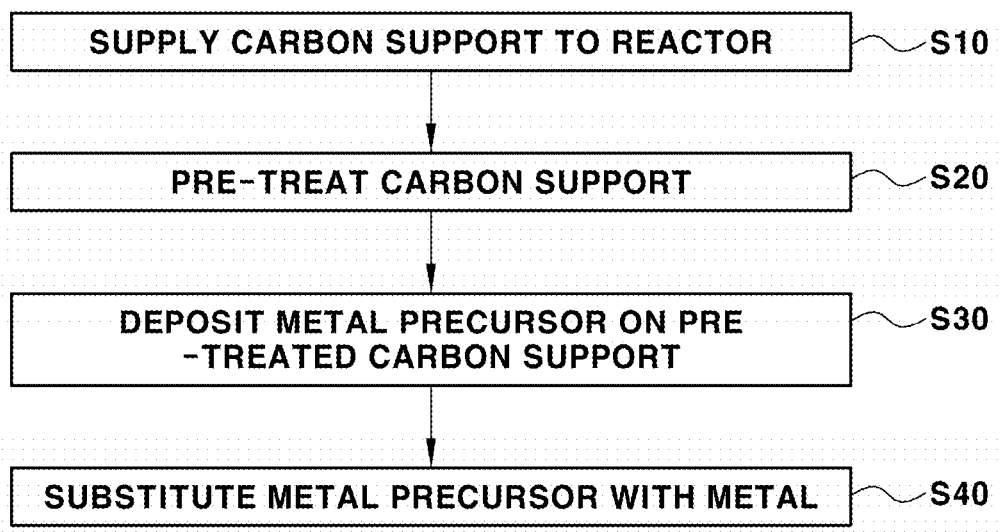
FIG. 1 shows an exemplary method for preparing an exemplary metal catalyst composite according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. In the following description of the embodiments, the same elements are denoted by the same reference numerals even though they are depicted in different drawings.

Unless stated as having other definitions, all terms (including technical and scientific terms) used in the following description of the embodiments will be interpreted as having meanings which those skilled in the art can understand. Also, terms which are defined in generally used dictionaries are not to be interpreted ideally or excessively unless clearly defined as having special meanings.

Also, terms used in the description of the embodiments serve merely to describe the embodiments and do not limit the present invention. In the description of the embodiments, singular expressions may encompass plural expressions, unless they have clearly different contextual meanings. In the following description of the embodiments, terms, such as "comprising" and/or "including", will be interpreted as indicating the presence of characteristics, numbers, steps, operations, elements and/or parts stated in the description or combinations thereof, and do not exclude the presence of one or more other characteristics, numbers, steps, operations, elements and/or parts, combinations thereof or possibility of adding the same. In addition, the term "and/or" will be interpreted as including each of stated items and all combinations of one or more thereof.

Further, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in detail with reference to the accompanying drawings.

FIG. 1 shows an exemplary method for preparing an exemplary metal catalyst composite according to various exemplary embodiments of the present invention.

In one aspect, the method of preparing a metal catalyst composite may include pre-treating a carbon support in a reactor; and depositing a metal precursor on the pre-treated carbon support. For instance, as shown in FIG. 1, the method for preparing the metal catalyst composite may include supplying a carbon (C) support to a reactor (S10), pre-treating the carbon support supplied to the reactor (S20), and depositing a metal precursor on the pre-treated carbon support by supplying the metal precursor to the reactor (S30).

Particularly, in the method for preparing a metal catalyst composite (supported metal catalyst) in an exemplary embodiment of the present invention, pre-treatment of the carbon support (S20) may include exposing the carbon support to a nucleating agent. The nucleating agent may suitably include one or more selected from the group consisting of titanium tetrachloride ($TiCl_4$), silicon tetrachloride ($SiCl_4$) and carbon tetrachloride ($CCl_4$). By exposing the carbon support to the nucleating agent, such as titanium tetrachloride ($TiCl_4$), silicon tetrachloride ($SiCl_4$) and carbon tetrachloride ($CCl_4$), generation of nucleation sites of the metal precursor on the surface of the carbon support may be facilitated or the number of the nucleation sites may be increased.

The method for preparing a metal catalyst composite (supported metal catalyst) may further include substituting the metal precursor with a metal (S40) after deposition of the metal precursor (S30). Thereby, a catalyst in which the metal is supported on the carbon support may be prepared. Therefore, the metal precursor may be deposited at a high density (S30) due to increase in the number of the nucleation sites in pre-treatment of the carbon support (S20), the metal precursor may be substituted with the metal (S40), and thus a metal catalyst having a large electrochemically active surface area and improved performance may be prepared. Consequently, a specific surface area to mass of the used metal catalyst is increased, and thus, performance (i.e., an electrochemically active surface area) of the catalyst may be improved and production costs of the catalyst may be reduced.

In deposition of the metal precursor (S30) according to an exemplary embodiment of the present invention, the metal precursor may suitably include, for example, a platinum (Pt) precursor. The platinum precursor may include, for example, trimethyl(methylcyclopentadienyl)platinum(IV) ($MeCpPtMe_3$), without being limited thereto. By substituting the deposited platinum precursor with platinum (Pt) (S40), a carbon catalyst in which platinum (Pt) is supported may be finally prepared.

Hereinafter, characteristics of the respective operations of the preparation method will be described in detail.

First, supply of the carbon support to the reactor (S10) according to an exemplary embodiment of the present invention may be performed, for example, by loading the inside of the reactor with a small amount of the carbon support. Here, an inner pressure of the reactor loaded with the carbon support may be maintained at about $10^{-10}$ Torr to 1 Torr. Alternatively, the inner pressure of the reactor loaded with the carbon support may be substantially maintained in a vacuum state.

In supply of the carbon support to the reactor (S10), the carbon support supplied to the inside of the reactor may include carbon black, without being limited thereto. Non-limiting examples of the carbon support that may support a metal catalyst may include Ketjen black, carbon black, carbon nanoparticles, carbon fibers, graphite, graphene, carbon nanotubes, fullerene or the like. Preferably, the carbon support may be formed of Ketjen black or carbon black. Pre-treatment of the carbon support (S20) according to an exemplary embodiment of the present invention may include exposing the carbon support to the nucleating agent, such as titanium tetrachloride ($TiCl_4$), silicon tetrachloride ($SiCl_4$) and carbon tetrachloride ($CCl_4$) for about 10 minutes to 20 minutes. For instance, pre-treatment of the carbon support (S20) may include exposing the carbon support to titanium tetrachloride ($TiCl_4$) for 10 minutes to 20 minutes. In order to effectively pre-treat the carbon support (S20), the carbon support (for example, carbon black) may be exposed to (i.e., contact) titanium tetrachloride ($TiCl_4$) gas for about 10 minutes or longer by injecting titanium tetrachloride ($TiCl_4$) gas into the reactor.

When the carbon support is exposed to titanium tetrachloride ($TiCl_4$) gas for about 10 minutes or longer, the carbon support may be sufficiently pre-treated, and thus, a density of the metal precursor supported on the carbon support during deposition of the metal precursor (S30), which will be performed thereafter, may be increased. Therefore, activity of the catalyst finally acquired by substituting the metal precursor with the metal (S40) may be increased. However, when the carbon support is exposed to titanium tetrachloride ($TiCl_4$) gas for a time of less than about 10 minutes, contact between titanium tetrachloride ($TiCl_4$) gas and the carbon support (for example, carbon black) may not be completed, and thus, in deposition of the metal precursor (S30) which will be performed thereafter, improvement in the particle density and the electrochemically active surface area of the metal precursor may be insignificant. In an exemplary embodiment, the pre-treatment of the carbon support (S20) may include exposing the carbon support to silicon tetrachloride ($SiCl_4$) or carbon tetrachloride ($CCl_4$) for about 10 minutes to 20 minutes.

Further, pre-treatment of the carbon support (S20) according to an exemplary embodiment of the present invention may include heating the reactor loaded with the carbon support. Thereby, pre-treatment of the carbon support (S20) may be performed at a temperature greater than room temperature.

Particularly, in pre-treatment of the carbon support (S20) according to an exemplary embodiment of the present invention, an inner temperature of the reactor loaded with the carbon support may be about 200° C. to 400° C. Particularly, when pre-treatment of the carbon support (S20) is performed under the condition that the inner temperature of the reactor is about 400° C. or greater, and when the platinum (Pt) precursor is used as the metal precursor in deposition of the metal precursor (S30) which will be performed thereafter, a loading amount of the platinum (Pt) precursor may be sharply reduced. Particularly, when the inner temperature of the reactor is maintained at about 200° C. to 250° C. in pre-treatment of the carbon support (S20), pre-treatment of the carbon support may be effectively performed.

Further, in pre-treatment of the carbon support (S20), the inner temperature of the reactor may be maintained for about 30 minutes to 3 hours. For example, when the inner temperature of the reactor is maintained at a temperature of about 200° C. to 250° C. for about 1 hour, the pre-treating the carbon support (S20) may be particularly effectively performed.

Figure 2:
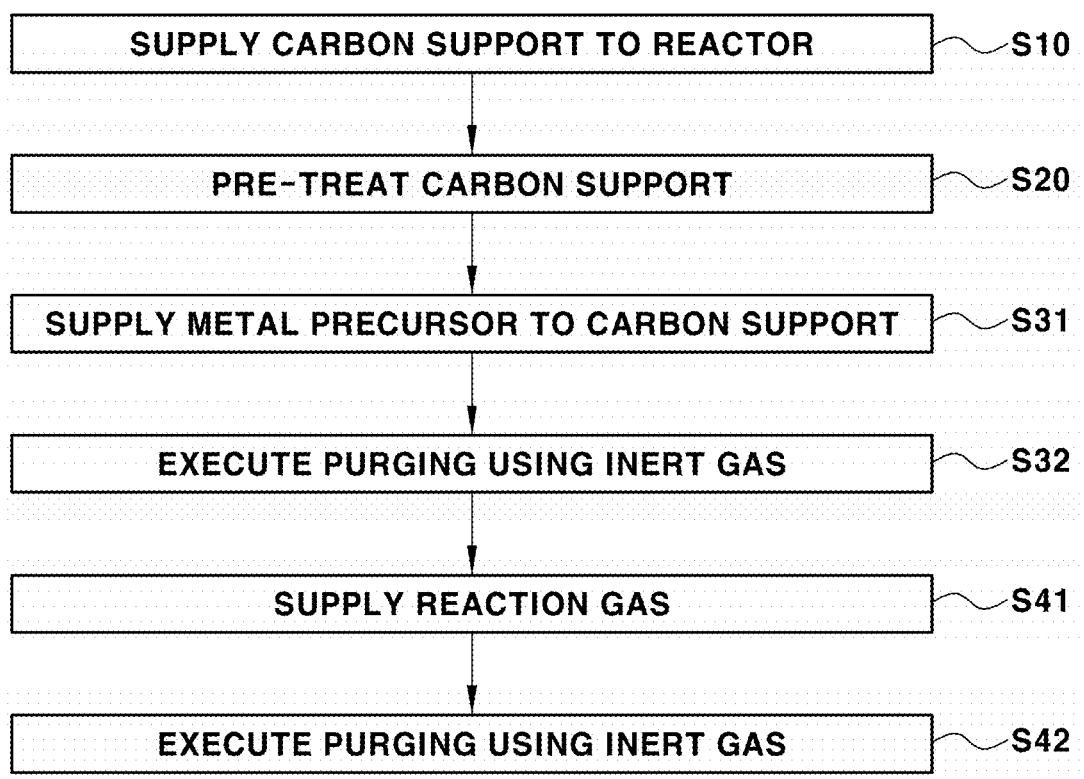
FIG. 2 shows an exemplary method for preparing an exemplary metal catalyst composite according to an exemplary embodiment of the present invention.

FIG. 2 shows an exemplary method for preparing a supported metal catalyst according to an exemplary embodiment of the present invention. For convenience of description, a detailed description of some parts in this figure, which are substantially the same as those in FIG. 1, will be omitted because it is considered to be unnecessary.

As shown in FIG. 2, in the method for preparing a supported metal catalyst according to an exemplary embodiment of the present invention, deposition of a metal precursor may be performed using atomic layer deposition (ALD). For example, the metal precursor may be coated in atomic layer units and thus be uniformly deposited on a carbon support. Thereafter, the metal precursor may be substituted with a metal, thus preparing a metal catalyst having a high density and a large electrochemically active surface area.

Preferably, the method for preparing a supported metal catalyst may include, after pre-treatment of the carbon support (operation S20), supplying the metal precursor to the carbon support (operation S31), first purging an inert gas into the reactor (operation S32), supplying reaction gas to substitute the metal precursor with the metal (operation S41), and second purging the inert gas into the reactor (operation S42). Thereby, the metal precursor may be deposited on the carbon support using ALD and the metal precursor may be finally substituted with the metal, thus preparing the supported metal catalyst.

For example, in the method for preparing a supported metal catalyst, above operations S31, S32, S41 and S42 may be sequentially performed to be set as one cycle, and the cycle may be repeated. Preferably, such a cycle may be repeated 1 to 20 times. Particularly, when the cycle including operations S31, S32, S41 and S42 is repeated 5 times, the density of the metal deposited on the carbon support may be increased.

In operation S41, the supplied reaction gas may be one selected from the group consisting of, for example, oxygen ($O_2$), ozone ($O_3$) and a combination thereof, without being limited thereto. The supplied reaction gas may not exclude other gases which may be used to substitute the metal precursor deposited on the carbon support with the metal.

Figure 3:
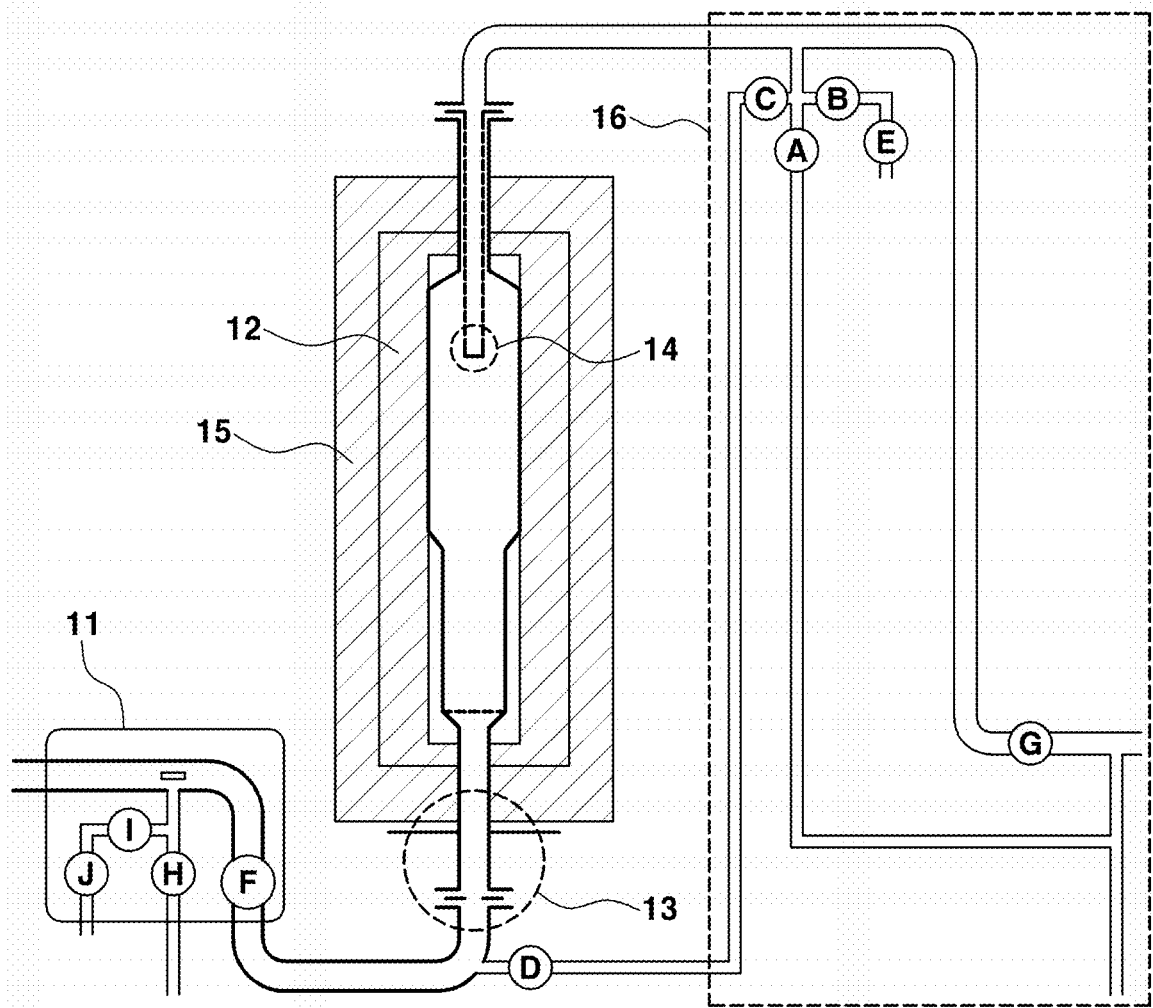
FIG. 3 shows an exemplary atomic layer deposition apparatus used in an exemplary method for preparing an exemplary metal catalyst composite according to an exemplary embodiment of the present invention.

FIG. 3 shows an atomic layer deposition apparatus used in an exemplary method for preparing a supported metal catalyst according to an exemplary embodiment of the present invention.

For instance, the atomic layer deposition apparatus may include an injection unit 11, a fluidized bed reactor (FBR) 12, an FBR inlet 13, an FBR outlet 14, a heater 15 and a pumping line 16.

The injection unit 11 may include, for example, a gas injection hole and a venting line. The gas injection hole may be connected to a canister which is filled with the metal precursor. Further, the metal precursor (for example, a platinum precursor) in the canister may maintain a temperature of about 40° C. or less. For example, as the platinum precursor, $MeCpPtMe_3$ may be provided in the canister to maintain a temperature of about 30° C.

The FBR 12 may include a rotating member. Therefore, while above operations S31, S32, S41 and S42 are performed, the rotating member may be driven. For example, the rotating member may include a mesh tip, and the mesh tip may be provided at the FBR outlet 14 and thus rotated. Thereby, adsorption of the carbon support (for example, carbon black) in the FBR 12 may be prevented.

Figure 4:
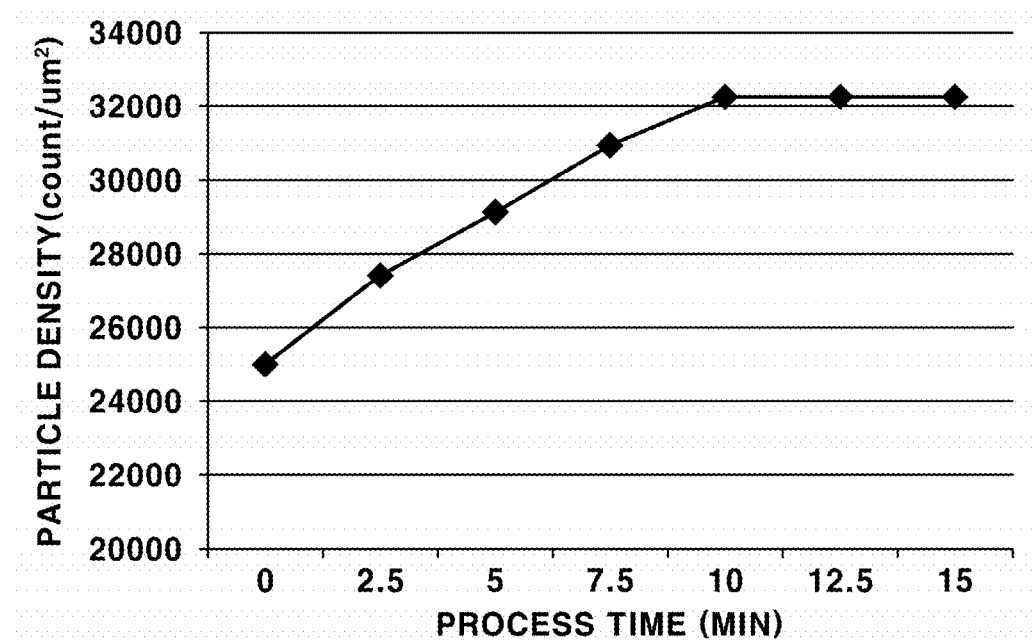
FIG. 4 is a graph representing particle density [count/$\mu m^2$] of an exemplary platinum (Pt) catalyst according to an exposure time to titanium tetrachloride ($TiCl_4$) during pretreatment according to an exemplary embodiment of the present invention.
Figure 5:
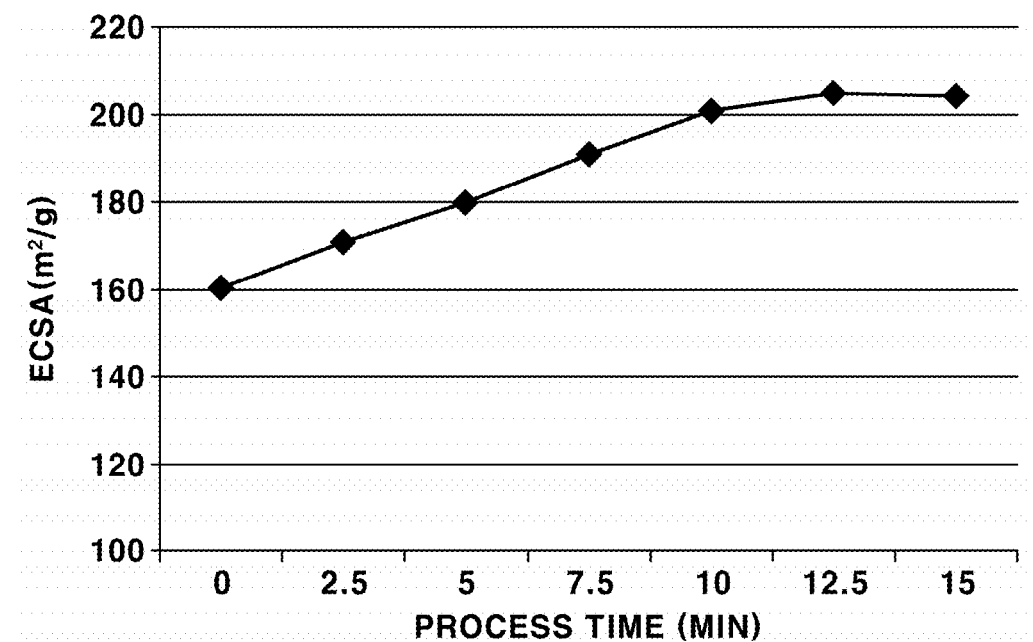
FIG. 5 is a graph representing an electrochemically active surface area [$m^2$/g] of an exemplary platinum (Pt) catalyst according to the exposure time to titanium tetrachloride ($TiCl_4$) during pre-treatment according to an exemplary embodiment of the present invention.
Figure 6A:
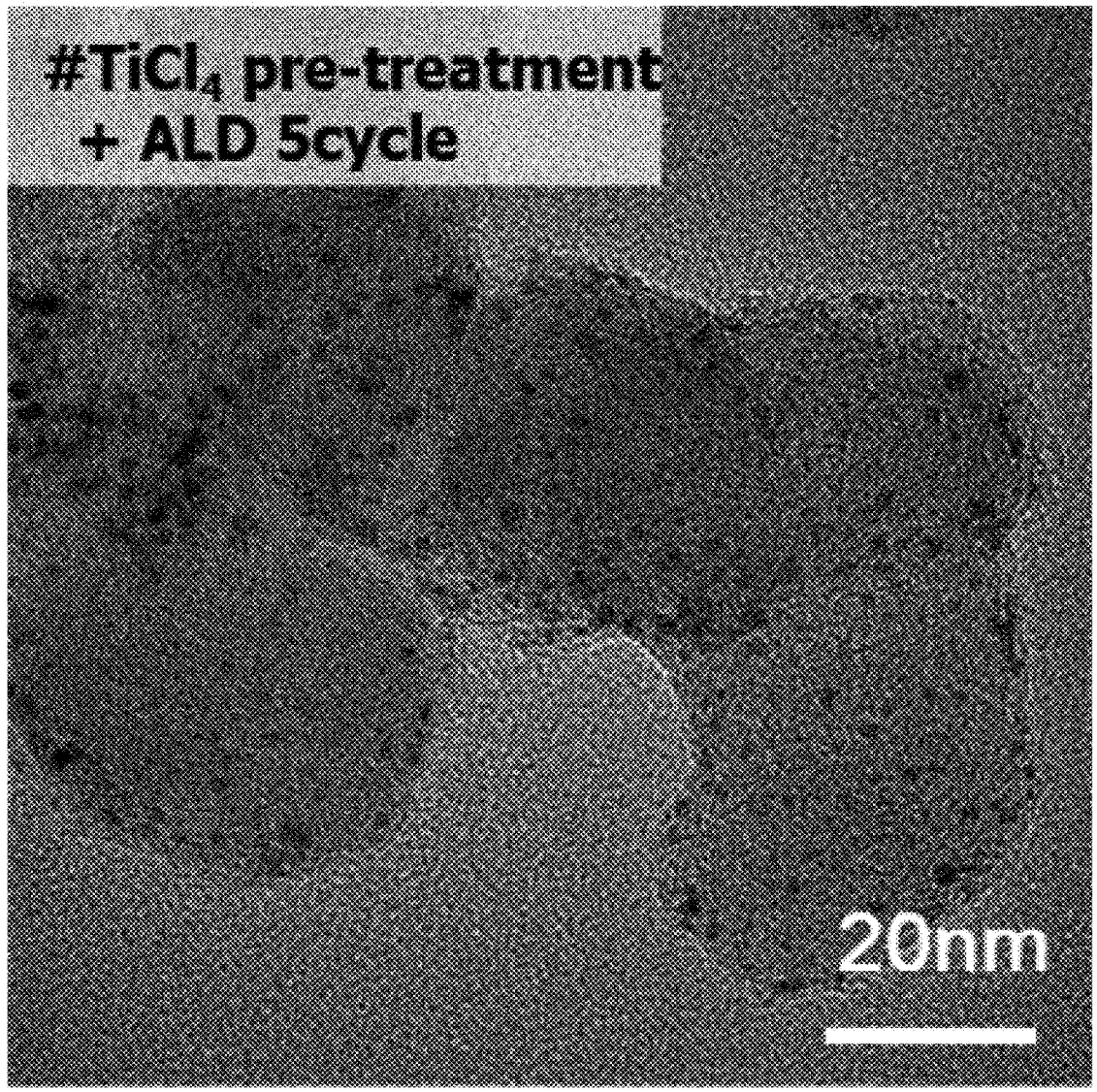
FIGS. 6A and 6B are, respectively, a transmission electron microscopy (TEM) image and a scanning transmission electron microscopy (STEM) image of an exemplary platinum (Pt) catalyst composite of example 1 according to an exemplary embodiment of the present invention.
Figure 6B:
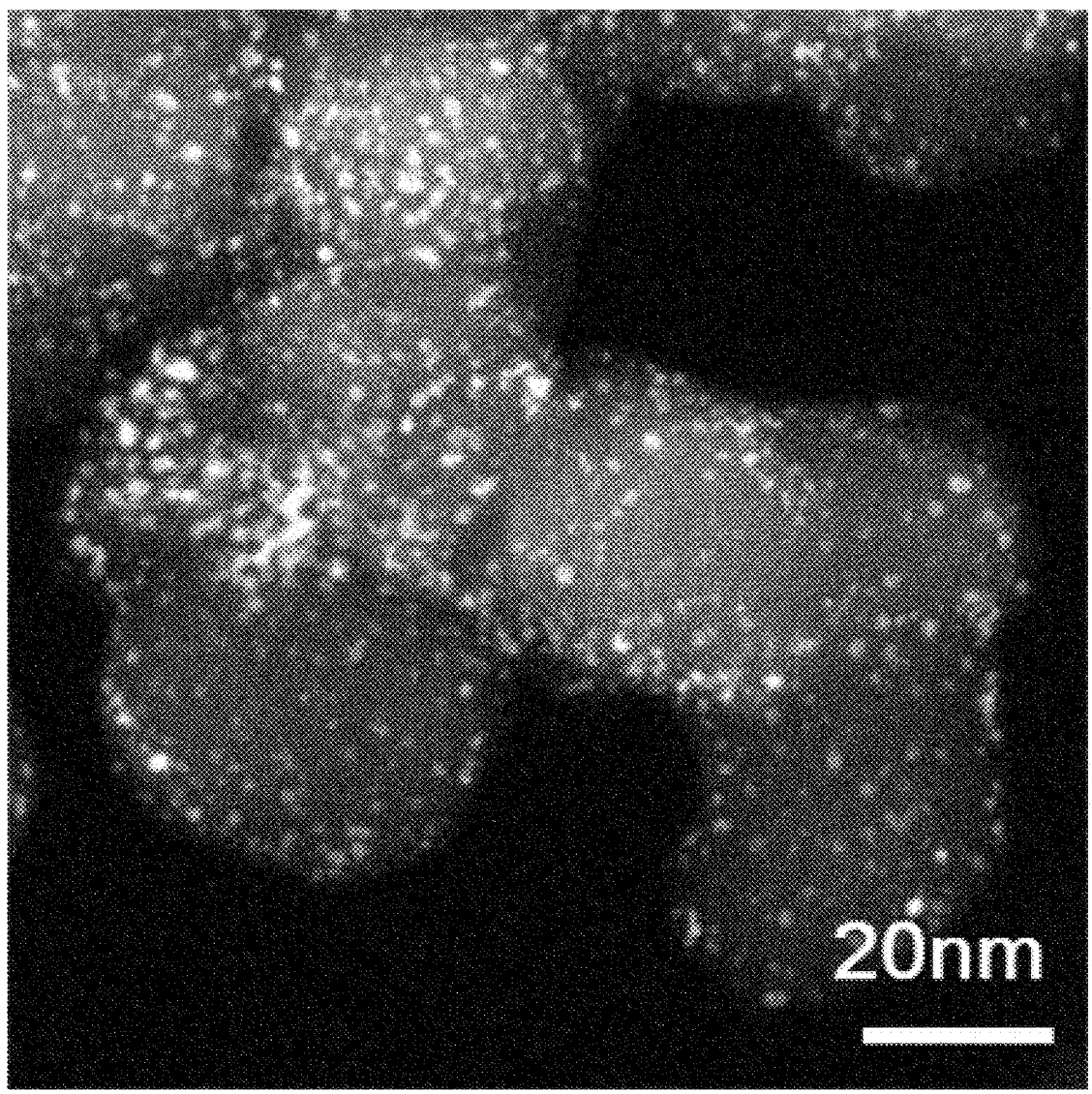
Figure 7A:
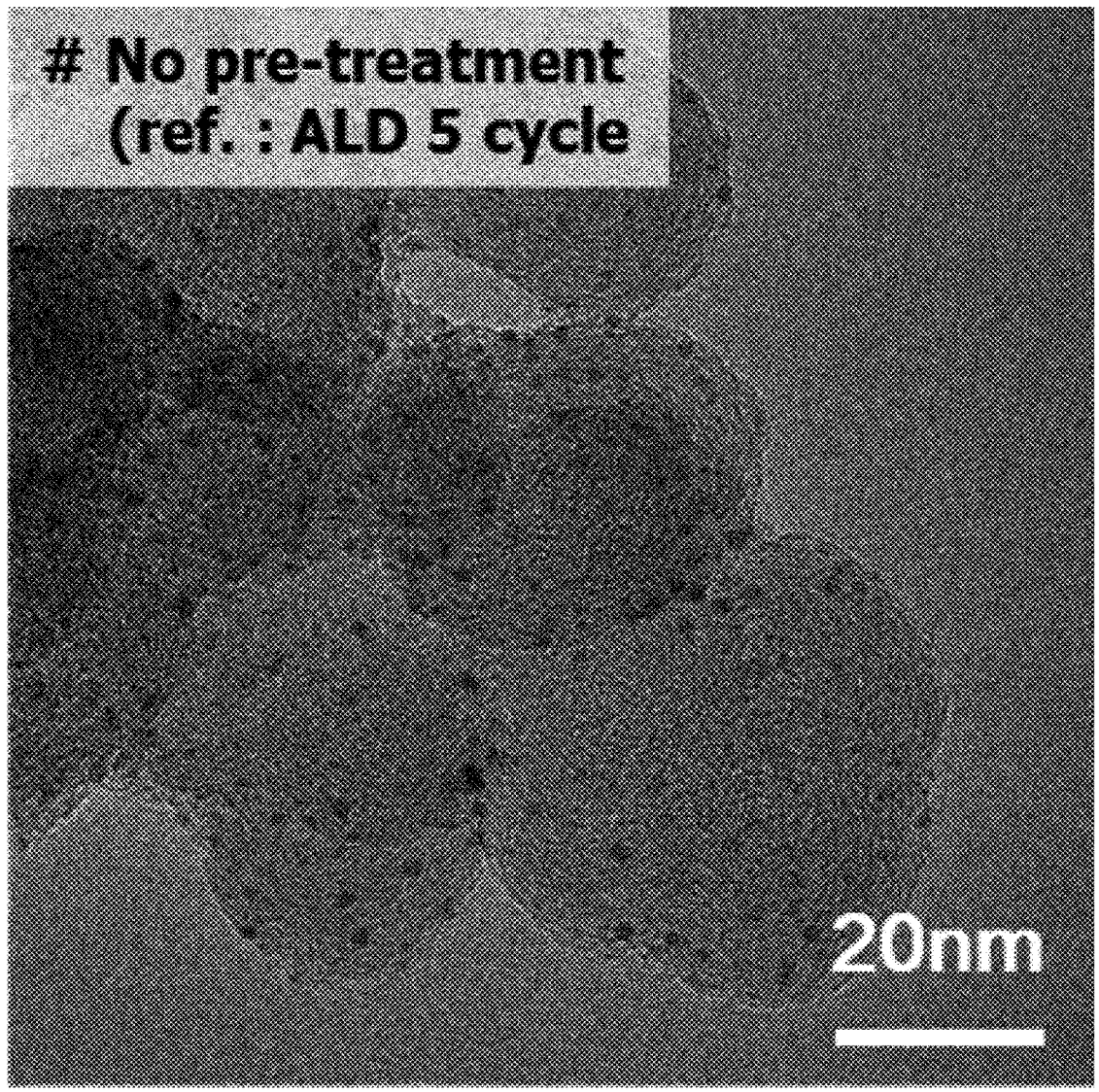
FIGS. 7A and 7B are, respectively, a TEM image and a STEM image of a platinum (Pt) catalyst composite of comparative example 1.
Figure 7B:
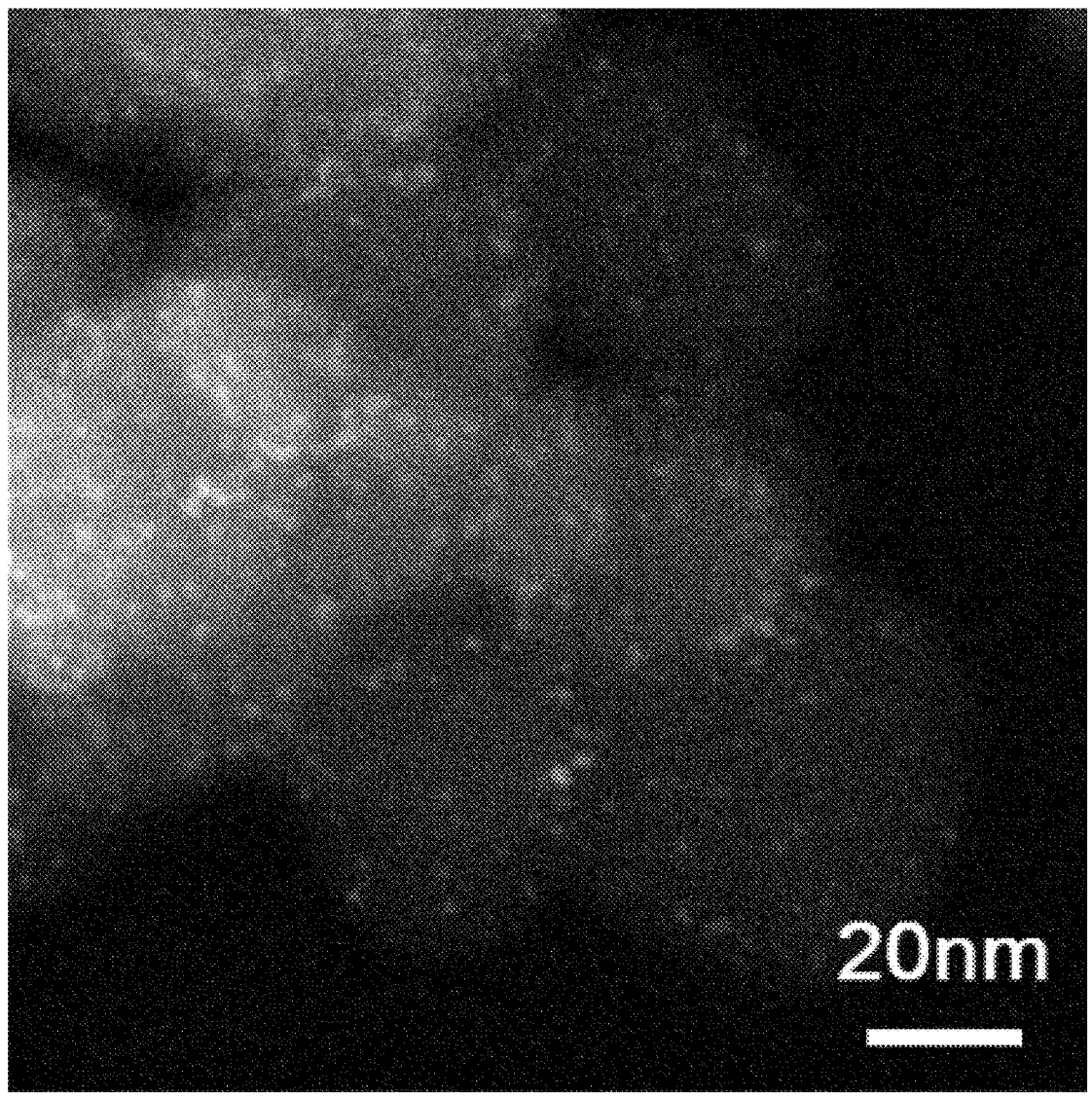
Figure 8A:
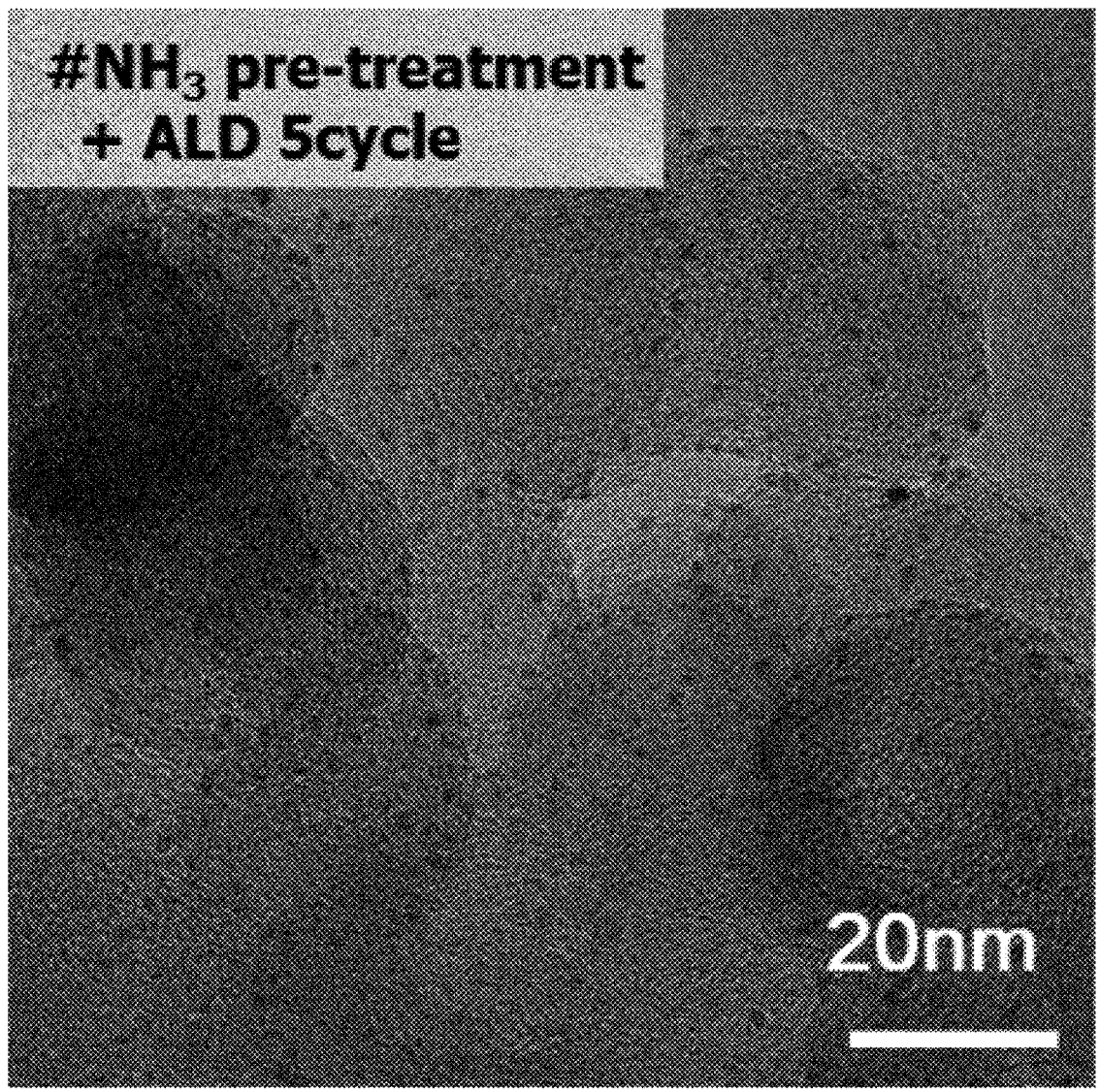
FIGS. 8A and 8B are, respectively, a TEM image and a STEM image of a platinum (Pt) catalyst composite of comparative example 2.
Figure 8B:
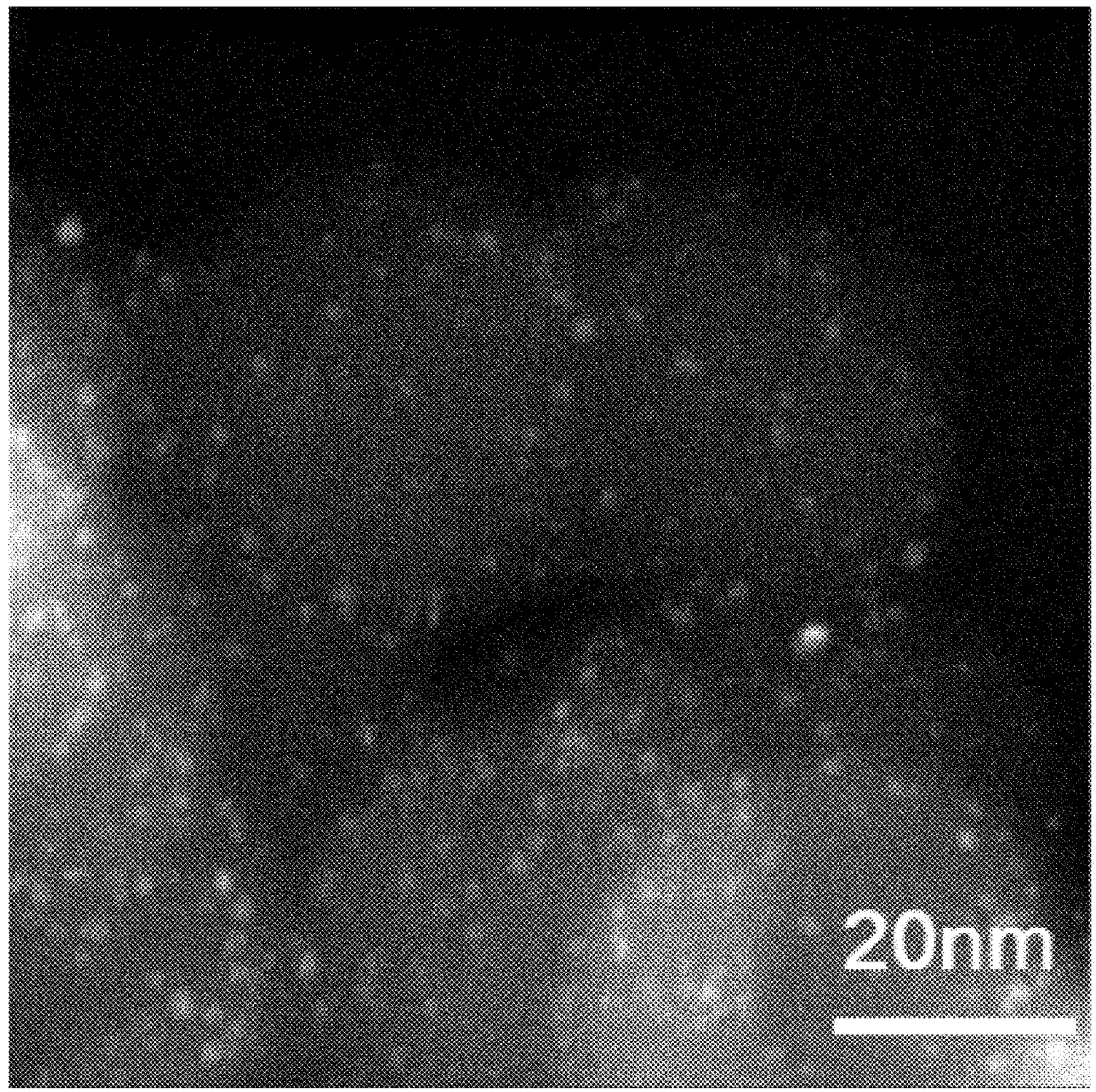
Figure 9A:
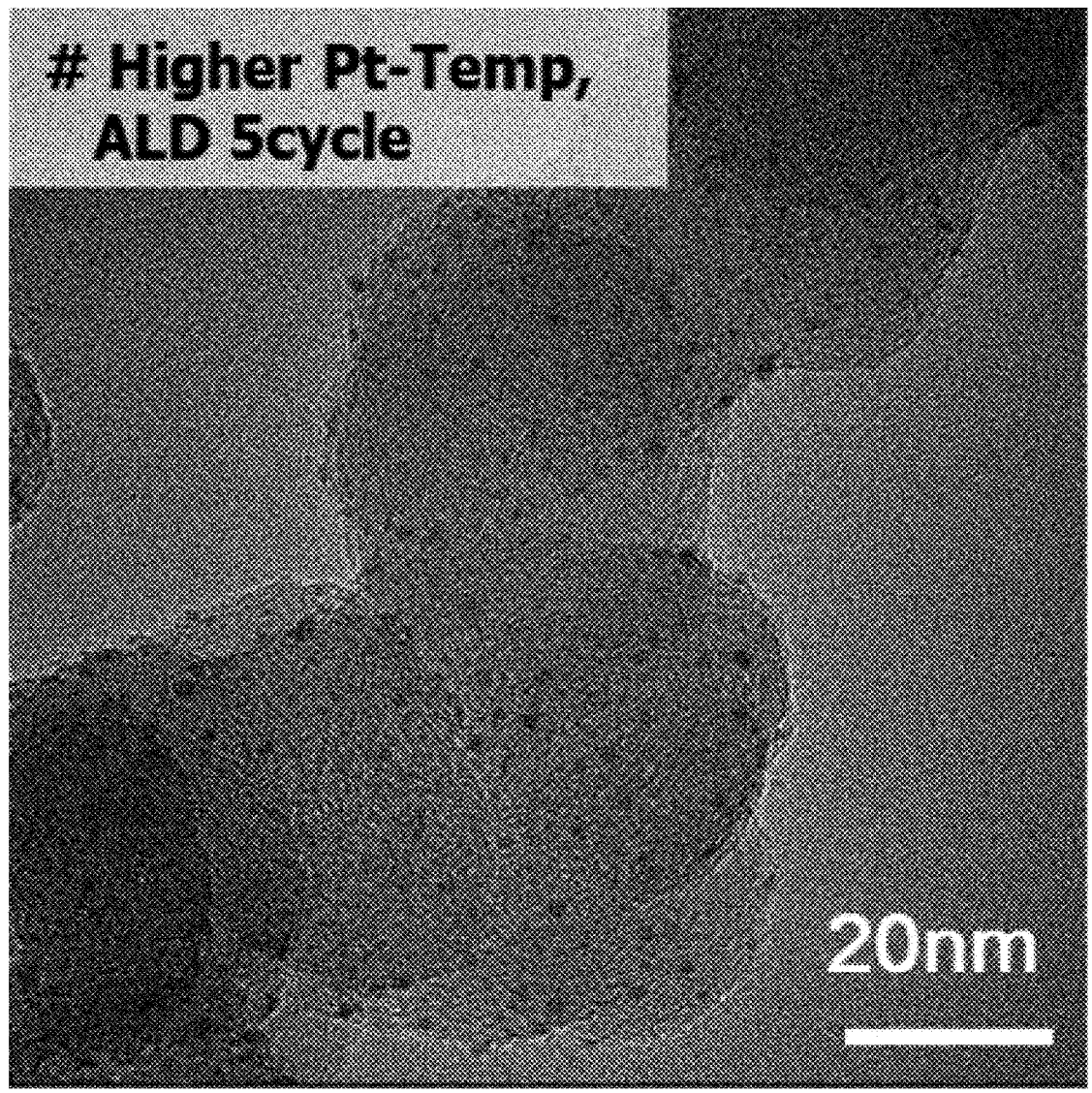
FIGS. 9A and 9B, respectively, are a TEM image and a STEM image of a platinum (Pt) catalyst composite of comparative example 3.
Figure 9B:
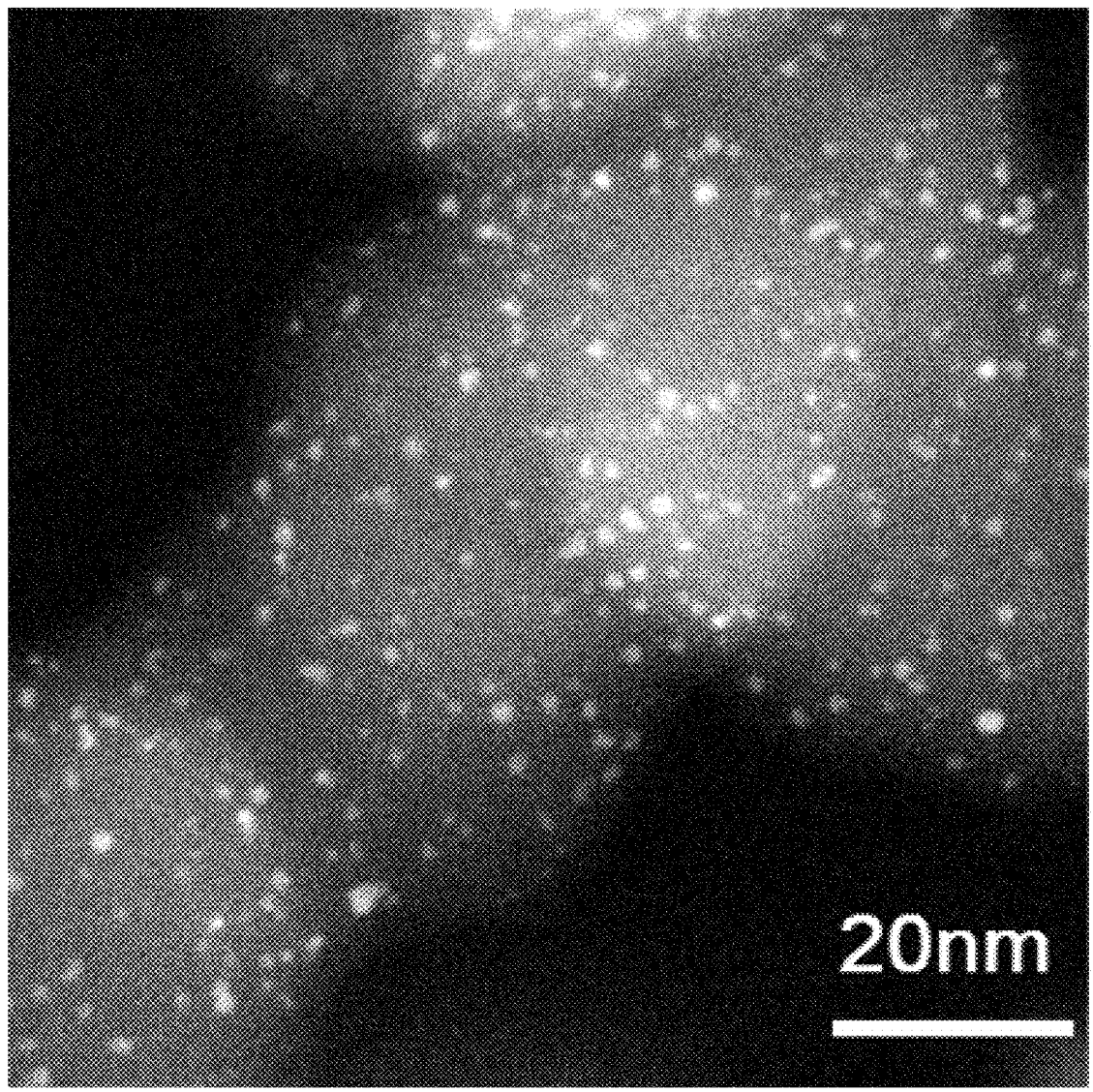

FIGS. 4 and 5 are graphs representing particle density [count/$\mu m^2$] and an electrochemically active surface area (ECSA) [$m^2/g$] of a platinum (Pt) catalyst according to an exposure time to titanium tetrachloride ($TiCl_4$) during pre-treatment.

As shown in FIG. 4, as the exposure time of carbon black to titanium tetrachloride ($TiCl_4$) gas is increased in pre-treatment of the carbon support (with reference to operation S20 of FIG. 2), particle density of the platinum precursor supported on carbon black may be increased in deposition of the platinum precursor (with reference to operations S31 and S32 of FIG. 2), which will be performed thereafter, and the density of platinum particles which are finally prepared may be increased. Particularly, when carbon black is exposed to titanium tetrachloride ($TiCl_4$) for about 10 minutes or longer, the density of the platinum particles which are finally prepared may be on a maximum value.

Further, as shown in FIG. 5, as the exposure time of carbon black to titanium tetrachloride ($TiCl_4$) gas is increased in pre-treatment of the carbon support (with reference to operation S20 of FIG. 2), the electrochemically active surface area (ECSA) [$m^2/g$] of the platinum precursor supported on carbon black may be increased in deposition of the platinum precursor (with reference to operations S31 and S32 of FIG. 2). In the same manner, when carbon black is exposed to titanium tetrachloride ($TiCl_4$) for about 10 minutes or longer, the electrochemically active surface area (ECSA) of the platinum particles which are finally prepared converges on a maximum value.

EXAMPLE

Hereinafter, the present invention will be described in more detail through the following example and comparative examples. The following example serves merely to exemplarily describe the present invention and is not intended to limit the scope of the invention.

Example 1

(1) Supplying a carbon support to a reactor: The inside of a fluidized bed reactor (FBR) was loaded with a small amount of carbon black. The inside of the FBR may be maintained in a vacuum state so that the inner pressure of the FBR is 1 Torr.

(2) Pre-treating the carbon support: Titanium tetrachloride ($TiCl_4$) was injected into the FBR and contacted carbon black for 10 minutes or longer. Further, the inner temperature of the FBR was maintained at a temperature of 200° C. to 250° C. for 1 hour.

(3) Depositing a metal precursor on the pre-treated carbon support and substituting the metal precursor with a metal: A platinum precursor was injected into the FBR by opening an injection hole of a canister filled with the platinum precursor. The temperature of the canister filled with the platinum precursor was set to a temperature of 30° C.

Here, injection of the platinum precursor, execution of purging using inert gas, supply of reaction gas (oxygen ($O_2$) or ozone ($O_3$)) and execution of purging using inert gas were set as one cycle, and the cycle was repeated 5 times. A mesh tip of an FBR outlet was rotated while repeating the cycle so as to prevent adsorption of carbon black, and thus, a supported platinum (Pt) catalyst was finally prepared.

Comparative Example 1

A supported platinum (Pt) catalyst was prepared using the same method as example 1, except that (2) pre-treatment of the carbon support of example 1 was not performed.

Comparative Example 2

A supported platinum (Pt) catalyst was prepared using the same method as example 1, except that, instead of titanium tetrachloride ($TiCl_4$), ammonia ($NH_3$) was injected into the FBR and contacted carbon black in (2) pre-treatment of the carbon support of example 1.

Comparative Example 3

A supported platinum (Pt) catalyst was prepared using the same method as example 1, except that the temperature of the canister filled with the platinum precursor was set to a temperature of 40° C. in (3) deposition of the metal precursor on the pre-treated carbon support of example 1.

Evaluation Example 1: Analysis of TEM Images and STEM Images

FIGS. 6A and 6B to FIGS. 9A and 9B are transmission electron microscopy (TEM) images and scanning transmission electron microscopy (STEM) images of the supported platinum (Pt) catalysts of example 1 and comparative examples 1 to 3, respectively.

Particularly, through comparison between the STEM images shown in FIGS. 6A and 6B and FIGS. 7A and 7B, there were great differences in the densities (i.e., of nucleation sites) and the electrochemically active surface areas (ECSA) of the prepared supported platinum (Pt) catalysts depending on whether or not pre-treatment including exposing the carbon support to titanium tetrachloride ($TiCl_4$) was performed, before supporting of platinum (Pt) on the carbon supported using ALD. Particularly, the density and the electrochemically active surface area (ECSA) of the supported platinum (Pt) catalyst of example 1 in which pre-treatment was performed were greatly increased as compared to the supported platinum (Pt) catalyst of comparative example 1 in which pre-treatment was not performed. Meanwhile, the supported platinum (Pt) catalysts had the same platinum particle size regardless of whether or not pre-treatment is performed.

Further, as compared to the supported platinum (Pt) catalyst of comparative example 2 in which the carbon support was exposed to ammonia ($NH_3$) for 10 minutes or longer (referring to FIGS. 8A and 8B) and the supported platinum (Pt) catalyst of comparative example 3 in which the temperature of the platinum precursor was set to a temperature of 40° C. (referring to FIGS. 9A and 9B), the density and the electrochemically active surface area (ECSA) of the supported platinum (Pt) catalyst of example 1 were greatly increased.

Evaluation Example 2: Comparison of Particle Densities [Count/$\mu m^2$]

Figure 10:
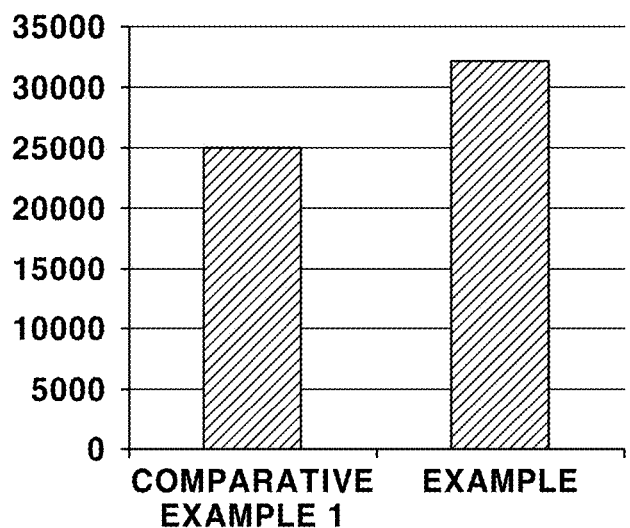
FIG. 10 is a graph comparatively representing particle densities [count/$\mu m^2$] of platinum (Pt) catalyst composites of example 1 according to an exemplary embodiment of the present invention and comparative example 1.

FIG. 10 is a graph comparatively representing particle densities [count/$\mu m^2$] of the supported platinum (Pt) catalysts of example 1 and comparative example 1. As shown in FIG. 10, the density of platinum (Pt) particles of the supported platinum (Pt) catalyst of example 1 in which pre-treatment was performed was increased by about 29%, as compared to the supported platinum (Pt) catalyst of comparative example 1 in which pre-treatment was not performed. Further, as described above in evaluation example 1, the supported platinum (Pt) catalysts had the same platinum particle size regardless of whether or not pre-treatment is performed.

Therefore, the pre-treatment process according to exemplary embodiments of the present invention may increase the particle density and the electrochemically active surface area of a supported metal catalyst without growth of the size of metal catalyst particles and thus improve performance of the supported metal catalyst.

Evaluation Example 3: Result Analysis of TGA Graph

Figure 11:
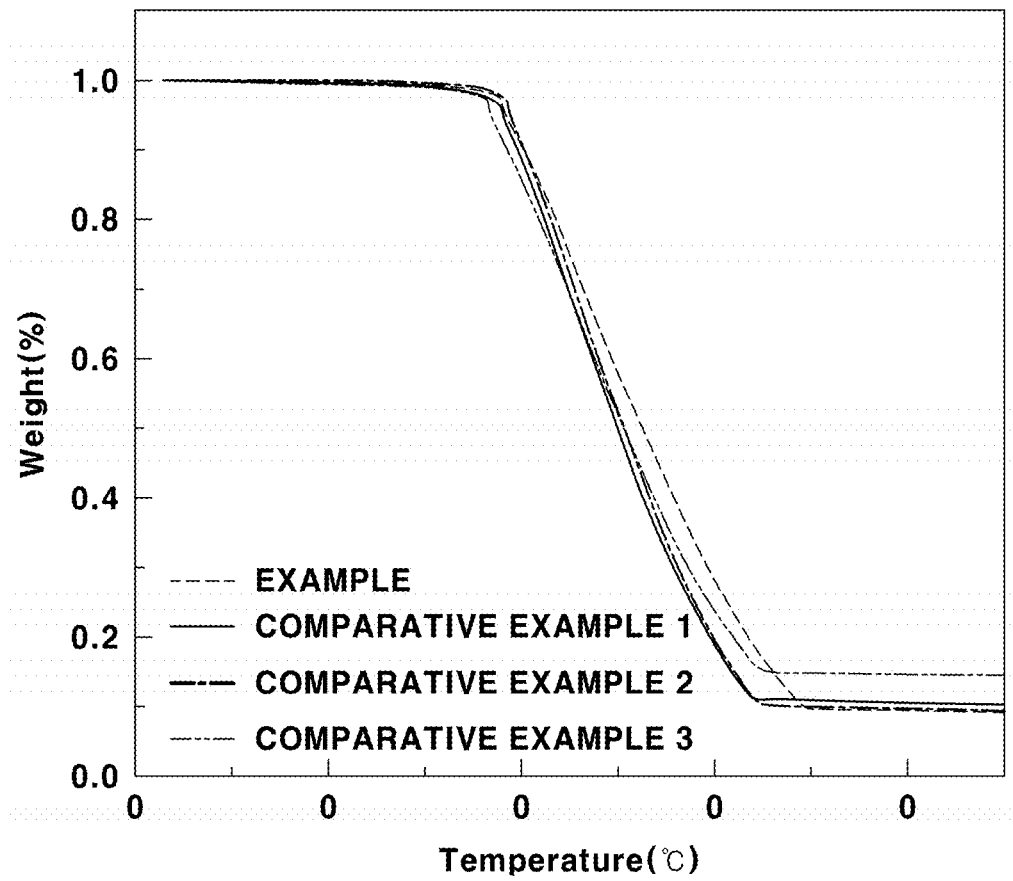
FIG. 11 is a thermogravimetric analysis (TGA) graph representing changes in weight percent (wt %) of the platinum (Pt) catalysts composite of example 1 according to an exemplary embodiment of the present invention and comparative examples 1 to 3 according to temperature.

FIG. 11 is a thermogravimetric analysis (TGA) graph representing changes in weight percent (wt %) of the supported platinum (Pt) catalysts of example 1 and comparative examples 1 to 3 according to temperature.

As shown in FIG. 11, there were few changes in the weight percent (wt %) of the supported platinum (Pt) catalysts of example 1 and comparative examples 1 to 3 at a temperature of 200° C. to 400° C., but loading amounts (wt %) of platinum (Pt) of the supported platinum (Pt) catalysts were rapidly reduced at a temperature of 400° C. or higher. Further, through comparison of the loading amounts (wt %) of platinum (Pt) of the supported platinum (Pt) catalysts at the same temperature, it may be understood that the loading amount (wt %) of platinum (Pt) of the supported platinum (Pt) catalyst of example 1, in which pre-treatment including exposing the carbon support to titanium tetrachloride ($TiCl_4$) was performed, was highest.

Evaluation Example 4: Measurement Result Analysis of CV

Figure 12:
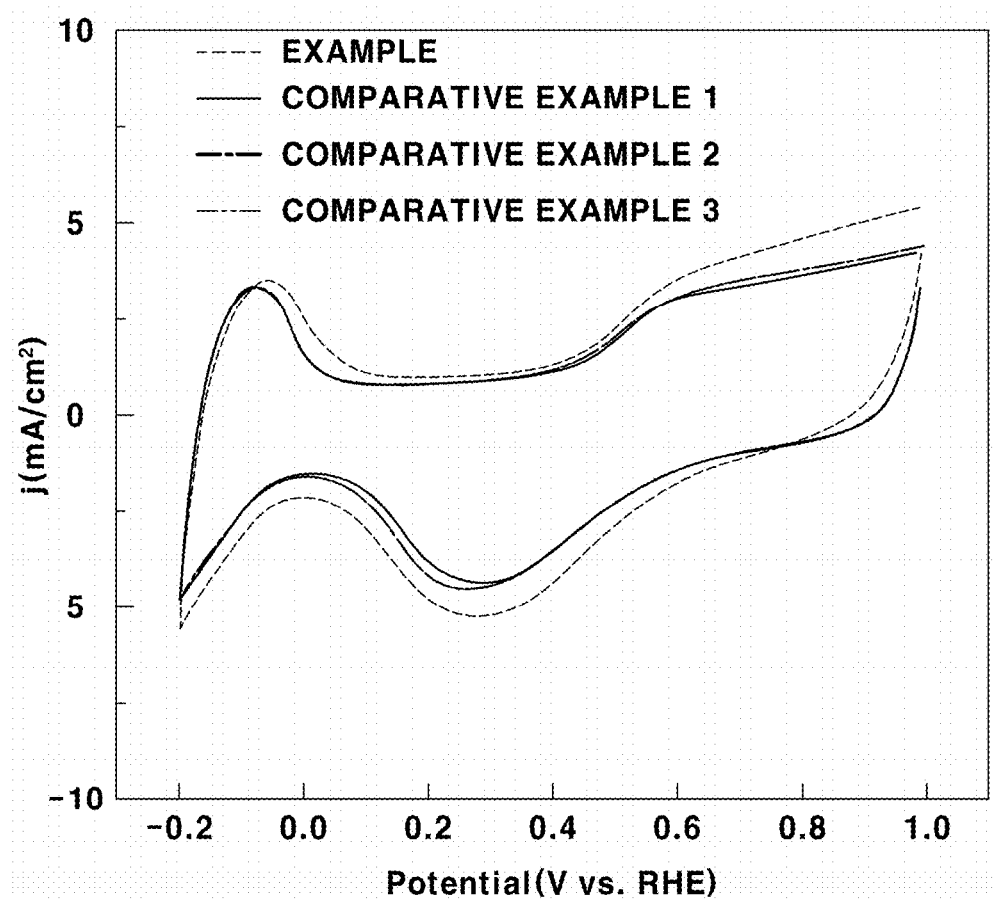
FIG. 12 is a graph representing cyclic voltammetry (CV) characteristic evaluation results of the supported platinum (Pt) catalysts of example 1 according to an exemplary embodiment of the present invention and comparative examples 1 to 3.

FIG. 12 is a graph representing cyclic voltammetry (CV) characteristic evaluation results of the supported platinum (Pt) catalysts of example 1 and comparative examples 1 to 3.

As shown in FIG. 12, the electrochemically active surface area of the supported platinum (Pt) catalyst of example 1, in which pre-treatment including exposing the carbon support to titanium tetrachloride ($TiCl_4$) was performed, was higher than those of the supported platinum (Pt) catalysts of comparative examples 1 to 3.

Table 1 below states results representing evaluation values of hydrogen desorption charge amounts ($Q_H$) [mC], platinum (Pt) particle loading amounts (wt %), working electrodes loaded with platinum (Pt) [g/m²] and electrochemically active surface areas (ECSA) [m²/g] of the supported platinum (Pt) catalysts of example 1 and comparative examples 1 to 3.

TABLE 1

| Pre-treatment method | | QH [mC] | wt % | Working electrode loaded with Pt [g/m²] | ECSA [m²/g] |
|---|---|---|---|---|---|
| Example 1 | $TiCl_4$ | 12.346 | 9.87 | 0.292401126 | 201.061 |
| Comparative example 1 | Reference | 10.844 | 10.89 | 0.322618871 | 160.0591 |
| Comparative example 2 | $NH_3$ | 11.928 | 10.49 | 0.310768775 | 182.7725 |
| Comparative example 3 | Pt-Temp | 11.635 | 15.08 | 0.44674863 | 124.0178 |

Here, the hydrogen desorption charge amount ($Q_H$) [mC] of platinum particles included in each supported platinum (Pt) catalyst was evaluated as an area acquired by multiplying a current value by a voltage value in the range of −0.2 V to 1.0 V (vs. RHE) of a cyclic voltammogram of each supported platinum (Pt) catalyst, and evaluation results thereof were stated in Table 1 above. The hydrogen desorption charge amount ($Q_H$) is an adsorption amount of hydrogen ions onto metal catalyst particles (for example, platinum (Pt) particles), and becomes a base of calculation of an electrochemically specific surface area of each metal catalyst particle.

Therefore, through the result values of Table 1, the supported platinum (Pt) catalyst of example 1 had the maximum electrochemically specific surface area value and the maximum electrochemically active surface area value, as compared to the loading amount (wt %) of platinum (Pt) particles.

As is apparent from the above description, in a method for preparing a supported metal catalyst according to various exemplary embodiments of the present invention, generation of metal nucleation sites on the surface of a carbon support may be facilitated and the number of the nucleation sites may be increased through pre-treatment for exposing the carbon support to the nucleating agent such as titanium tetrachloride ($TiCl_4$), silicon tetrachloride ($SiCl_4$) and carbon tetrachloride ($CCl_4$).

Further, in the method according to various exemplary embodiments of the present invention, a metal precursor may be deposited on the pre-treated carbon support using atomic layer deposition (ALD) and thereafter the metal precursor is substituted with a metal, thereby preparing a supported metal catalyst having a high density and a large electrochemically active surface area.

In addition, in the method according to various exemplary embodiments of the present invention, a specific surface area to mass of the supported metal catalyst may be increased, and thus, performance of the supported metal catalyst may be improved and a necessary amount of the metal may be reduced, i.e., cost savings may be realized.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a metal catalyst composite, comprising:
    pre-treating a carbon support in a reactor; and
    depositing a metal precursor on the pre-treated carbon support,
    wherein the pre-treating of the carbon support comprises exposing the carbon support to a nucleating agent.

2. The method of claim 1, wherein the nucleating agent is one or more selected from the group consisting of titanium tetrachloride ($TiCl_4$), silicon tetrachloride ($SiCl_4$) and carbon tetrachloride ($CCl_4$).

3. The method of claim 1, wherein, an inner pressure of the reactor is maintained at about $10^{-10}$ Torr to 1 Torr.

4. The method of claim 1, wherein the carbon support comprises carbon black.

5. The method of claim 1, wherein in the pre-treating, the carbon support is exposed to the nucleating agent for about 10 minutes to 20 minutes.

6. The method of claim 1, wherein the pre-treating of the carbon support comprises heating the reactor.

7. The method of claim 6, wherein, in the pre-treating of the carbon support, an inner temperature of the reactor is within a range of about 200° C. to 400° C.

8. The method of claim 7, wherein, in the pre-treating of the carbon support, the inner temperature of the reactor is maintained for about 30 minutes to 3 hours.

9. The method of claim 1, wherein, in the depositing of the metal precursor, the metal precursor comprises a platinum (Pt) precursor.

10. The method of claim 1, further comprising substituting the metal precursor with a metal, after the depositing of the metal precursor.

11. The method of claim 1, wherein the depositing of the metal precursor is performed using an atomic layer deposition (ALD) method.

12. The method of claim 11, wherein the ALD method comprises:
supplying the metal precursor to the carbon support;
first purging an inert gas into the reactor;
substituting the metal precursor with a metal by supplying a reaction gas into the reactor; and
second purging the inert gas into the reactor.

13. The method of claim 12, wherein the supplying of the metal precursor, the first purging, the substituting of the metal precursor and the second purging are sequentially carried out to be set as one cycle, and the cycle is repeated.

14. The method of claim 13, wherein the cycle is repeated 1 to 20 times.

15. The method of claim 12, wherein the reaction gas comprises one selected from the group consisting of oxygen ($O_2$), ozone ($O_3$) and a combination thereof.

16. The method of claim 1, wherein:
the reactor comprises a rotating member; and
the rotating member is driven during the supplying the metal precursor, the first purging, the substituting the metal precursor and the second purging.

17. A metal catalyst composite prepared by a method of claim 1 comprising a carbon support and a metal catalyst deposited on the carbon support.

18. A fuel cell comprising a metal catalyst composite of claim 17.

19. A vehicle comprising a fuel cell of claim 18.

* * * * *